March 13, 1951  A. W. CRANFILL  2,545,228
ELONGATED SERVICE BOX
Filed Feb. 7, 1950  2 Sheets-Sheet 1
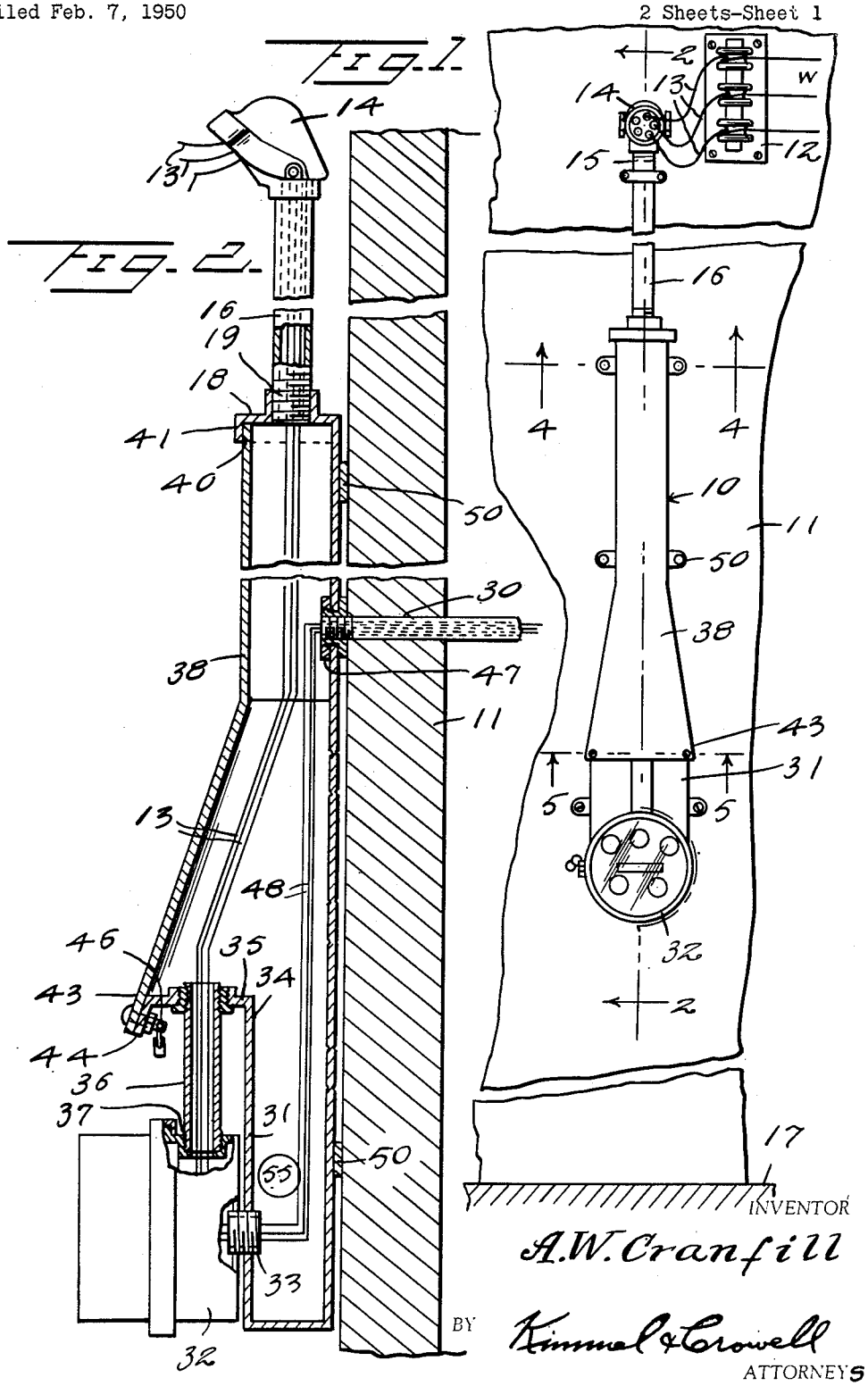
INVENTOR
A. W. Cranfill
BY Kimmel & Crowell
ATTORNEYS March 13, 1951
A. W. CRANFILL
2,545,228
ELONGATED SERVICE BOX
Filed Feb. 7, 1950
2 Sheets-Sheet 2
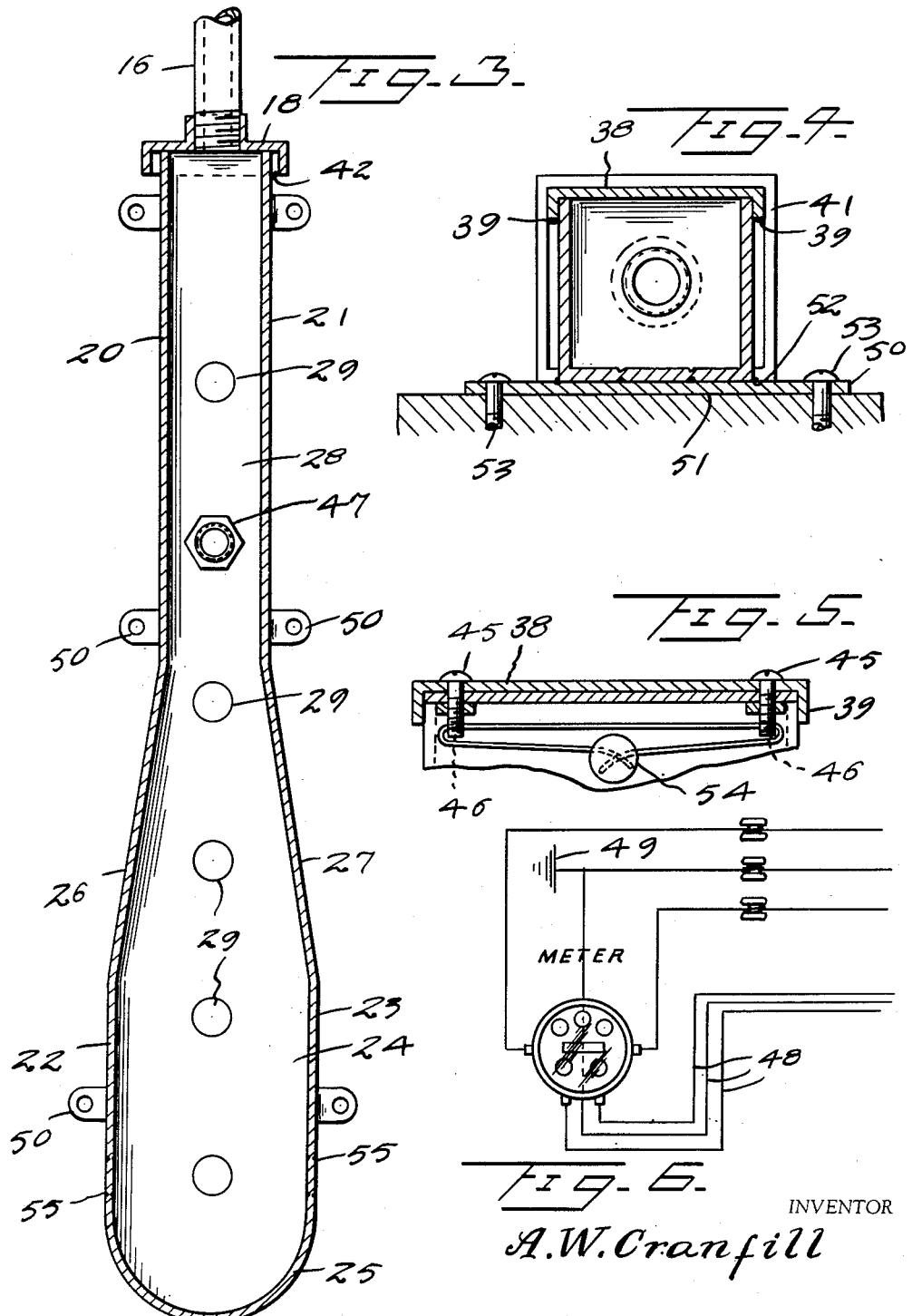
INVENTOR
A.W. Cranfill
BY Kimmel & Crowell
ATTORNEY Patented Mar. 13, 1951

2,545,228

UNITED STATES PATENT OFFICE 2,545,228

ELONGATED SERVICE BOX

Allen W. Cranfill, Williamsburg, Ky.

Application February 7, 1950, Serial No. 142,891

2 Claims. (Cl. 174—52)

1

This invention relates to electric service entrance devices and more particularly a self-contained enclosure for both the meter and entrance circuit wiring.

In providing service connection from overhead electrical facilities it is conventional practice to enclose the service wires in conduit extending from the point of service attachment to and beyond a fixedly mounted socket in which a meter is inserted and sealed against unauthorized changes in the connections thereto. The meter must be located within reaching distance from the ground in order to facilitate its reading, testing and servicing by authorized persons. This type of construction often necessitates a looped arrangement of the conduit system leading away from the meter in order to provide for entrance of the metered line at an elevated position relative to the ground line in order to properly locate the switch box inside the building at the proper distance above the floor line. Such a down-and-up run of conduit on the outside of a building is not only unsightly but also presents an expensive pipe fitting operation at each installation.

It is therefore among the objects of this invention to provide a service box complete in one unit capable of connection at different elevations.

A further object is to provide a sealable unitary weatherproof enclosure for all of the wires associated with a metered service entrance.

A still further object is to provide a service box unit ready of installation having conveniently arranged knockout openings for connection with housing circuits.

Another object is to provide a complete entrance unit for an electrical supply circuit that is rugged and inexpensive of construction and adapted for installation on the outside wall of a building.

Other objects and purposes than those stated will become apparent upon an understanding of the invention had from the following description taken in conjunction with the drawings in which like numbers refer to like parts in the different views.

In the drawings:

Figure 1 is a front view of the device of this invention installed on the outside of a building and connected to overhead service lines.

Figure 2 is an enlarged side sectional view.

Figure 3 is an enlarged front sectional view.

Figure 4 is an enlarged section taken on line 4—4 of Figure 1.

Figure 5 is a partial section taken on line 5—5 of Figure 1.

2

Figure 6 is a diagrammatic view of the electrical wiring involved.

Referring now in detail to the drawings, Figure 1 illustrates the service box 10 of the present invention installed on the outside wall 11 of a building, such as a framed dwelling, served from an overhead electrical distribution system by drop service wires W secured to a conventional housing bracket 12 and connected to entrance leads 13 of a conventional metered service connection. The entrance leads 13 or wires emerge for connection from a conventional type of conduilet or service head 14 fitted to the top end 15 of a suitable conduit 16 or service pipe of proper length and size to enclose the entrance wires extended from a point adjacent the metering point located within reaching distance of a person standing at the ground line 17. The service box 10 is formed as an elongated metal enclosure having a horizontal top 18 apertured to receive the bottom end 19 of the service conduit 16 threaded therein. It is to be understood that although a standard threaded connection between the service box 10 and a rigid conduit 16 is shown other types of connections can be made to the box 10 particularly such as a multi-lead flexible cable provided with conventional fittings. The box 10 is provided with spaced parallel side walls 20 and 21 (Figure 3) joined to the top 18 with the width of the parellel sides being increased as at 22 and 23 to form a widened portion 24 spaced downwardly from the top and terminating in a rounded bottom wall 25. Interconnecting the two differently spaced side wall areas are divergent transversely tapered side wall portions 26 and 27 suitably arranged to provide for the gradual merging of the spaced side walls.

Formed integrally with the side walls is a suitable back member 28 having spaced knockout openings 29 extending vertically and opening rearwardly of the box 10. The arrangement of the knockouts 29 provides for the mounting of an outlet nipple 30 (Figure 2) in the back wall 28 at a suitable height to extend through wall 11 of the building for connection with a distribution panel (not shown) located inside the building at a suitable elevation above the floor line.

As presently illustrated the nipple 30 is mounted in the next to the highest knockout opening as would be found necessary with the service box 10 mounted on the side of a building having a high floor level relative to the outside ground level. The nipple 30 is secured in place by a pair of threaded bushings 41 spaced inside and outside of the back wall 28.

Extending over widened portion 24 of the box 10 is a fixed front wall 31 of sufficient area for mounting thereon of a conventional type meter socket 32 having an interiorly opening coupling 33 engaging the socket with the front wall. The top end 34 of the fixed wall 31 is formed with an outwardly extending ledge 35 of sufficient depth to mount a downwardly extending metal duct 36 threadedly coupled to the meter socket 32 as at 37. The outer edge of ledge 35 is turned downwardly to provide a lip-like protrusion 44.

A removable door or plate 38 having laterally extending angularly formed spaced edges 39 (Figures 4 and 5) is arranged for positioning across the side walls to form a totally closed box with the lid in place. The top edge 40 of the lid 38 is adapted for insertion under the outer edge 41 of the box top 18 formed as a cap having overhanging edges spaced forwardly and to the sides of the side walls 20 and 21 as at 42. The bottom edge 43 of the door 38 is extended for overlapped engagement with the downwardly extending lip 44 of ledge 35. This overlapping of the bottom edge 43 of the door not only attains a weathershed effect but also provides for mounting of suitable securing means on the door 38 as bolts 45. The bolts 45 have their ends apertured as at 46 for insertion of a suitable seal means as the wire and seal 54 (Figure 5) inserted therethrough and formed as a sealed loop. The seal 54 provides means for restricting access to the interior of the box 10 only to authorized persons as is customary practice in the maintenance of such installations. The arrangement of the elevated fixed wall 31 having a horizontal ledge 35 allows for ample space within the box 10 for the unimpeded extension of the entrance leads 13 connected to the meter socket 32 with metered lines 48 being extended through coupling 33 and thence upwardly to nipple 30 for connection to the building circuits. One of the service leads 13 constitutes a neutral or ground wire and is conventionally grounded as at 49 with the box 10 bonded thereto.

Mounting of the box 10 on the building wall 11 is provided for by a plurality of lugs 50 positioned at each side of the box by protruding ends of metal strips 51 weldingly secured across the back of the box as at 52. These lugs 50 are apertured for insertion of suitable screws or bolts 53. In certain types of installations I have found it satisfactory to attach the box 10 directly to the wall 11 by screw means inserted through the back wall 28.

The box 10 is also provided with side knockout openings 55 formed in the sidewalls adjacent the meter. The purpose of the side knockouts 55 is to provide for the connection of a plurality of meters from the box 10 when used to serve an apartment house or a commercial building.

While I have described in detail the preferred embodiment of my invention I wish it to be understood that I do not intend to limit myself thereby except within the scope of the appended claims.

I claim:

1. An electrical service box comprising an elongated enclosure having spaced top, bottom, and side walls, an apertured back wall, a partial front wall, a forwardly extending apertured ledge in said front wall, and a cover including an offset angular portion closing the front of said box, the lower end of said offset portion seating against said ledge, a meter socket in said front wall and a duct connection between said socket and the aperture in said ledge.

2. An electrical service box comprising an elongated enclosure having spaced top, bottom, and side walls, an apertured back wall, a partial front wall, a forwardly extending apertured ledge in said front wall, and a cover including an offset angular portion closing the front of said box, the lower end of said offset portion seating against said ledge, a meter socket in said front wall, a duct connection between said socket and the aperture in said ledge, and a wire containing duct extending from said top wall.

ALLEN W. CRANFILL.

REFERENCES CITED

The following references are of record in the file of this patent:

UNITED STATES PATENTS

| Number | Name | Date |
|---|---|---|
| 1,337,163 | Schickluna | Apr. 13, 1920 |
| 2,436,431 | Hasselhorn | Feb. 24, 1948 |
| 2,457,347 | Casler et al. | Dec. 28, 1948 |

FOREIGN PATENTS

| Number | Country | Date |
|---|---|---|
| 125,811 | Switzerland | May 30, 1927 |
| 702,168 | Germany | Jan. 31, 1941 |